United States Patent [19]

Pampus et al.

[11] 3,933,778

[45] Jan. 20, 1976

[54] PROCESS FOR THE POLYMERISATION OF CYCLOOCTADIENE

[75] Inventors: Gottfried Pampus; Günther Lehnert, both of Leverkusen; Josef Witte, Cologne, all of Germany

[73] Assignee: Bayer Aktiengesellschaft, Leverkusen, Germany

[22] Filed: June 20, 1974

[21] Appl. No.: 481,208

[30] Foreign Application Priority Data

June 27, 1973 Germany............................ 2332565

[52] U.S. Cl..... 260/93.1; 260/33.6 UA; 260/88.2 E
[51] Int. Cl.² ......................................... C08F 4/22
[58] Field of Search ........ 260/93.1; 450/662.5, 666, 450/666.5

[56] References Cited
UNITED STATES PATENTS

| | | | |
|---|---|---|---|
| 3,657,208 | 4/1972 | Judy | 260/88.2 R |
| 3,707,520 | 12/1972 | Pampus et al | 260/33.6 AQ |
| 3,780,009 | 12/1973 | Dall'Asta | 260/93.1 |

*Primary Examiner*—Stanford M. Levin
*Attorney, Agent, or Firm*—Connolly and Hutz

[57] ABSTRACT

Ring opening polymerisation of cyclooctadiene-(1,5) (COD) optionally in an inert organic solvent on a catalyst of
 a. a tungsten salt,
 b. a halogenated alcohol in which the halogen and OH group are attached to adjacent carbon atoms, and/or an epoxide and/or a halogenated phenol, and
 c. an organo aluminium compound and/or an aluminium halide.

5 Claims, No Drawings

PROCESS FOR THE POLYMERISATION OF CYCLOOCTADIENE

This invention relates to a process for the ring opening polymerisation of cyclooctadiene-(1,5) (COD), wherein cyclooctadiene-(1,5) (COD) is contacted with a catalyst of
a. a tungsten salt,
b. a halogenated alcohol in which the halogen and OH group are attached to adjacent carbon atoms, and/or an epoxide and/or a halogenated phenol, and
c. an organo aluminium compound and/or an aluminium halide.

The process can be carried out in an inert organic solvent. With the process according to the invention, in particular with the catalyst indicated above, COD is polymerised under ring opening to yield unsaturated polyoctadienamers in which 20 to 85 percent of the double bonds are in the trans-configuration depending on the choice of aluminium component (component c) of the catalyst system. It is therefore possible to manufacture polyoctadienamers having a high cis-double bond content or a high trans-double bond content or any intermediate cis-trans double bond content ratio in one polymerisation plant, simply by changing the catalyst. In this way the properties of the polymer manufactured can be adjusted to order.

Thus, for example, a catalyst system of $WCl_6$, $HOCH_2-CH_2Cl$ and $AlBr_3$ in a molar ratio of 1 : 2 : 20° at 20°C yields 80 % or more conversion to polyoctadienamers within short reaction times (about 10 minutes). The polymers obtained contain 75 to 80 % of cis-double bonds and they are practically free from gel and 1,2-linkages. The same polymerisation carried out with a catalyst of $WCl_6$, $HOCH_2-CH_2Cl$ and $(C_2H_5)_3Al_2Cl_3$ in a molar ratio of 1 : 2 : 3, yields 90 percent conversion in one hour and the polyoctadienamers contain about 80 percent of trans-double bonds.

The following are examples of suitable catalyst components:
a. tungsten salts, in particular tungsten halides and oxyhalides such as $WCl_6$, $WCl_5$, $WBr_5$ and $WOCl_4$
b. halogenated alcohols of the general formula

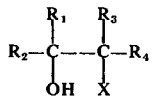

in which X represents chlorine, bromine or iodine; $R_1$ and $R_2$, may be the same or different and represent hydrogen or an alkyl, aryl or alkylaryl group; $R_3$ and $R_4$ may be the same or different and represent chlorine, bromine or iodine, hydrogen or an alkyl, aryl or alkylaryl group; and $R_1$ and $R_2$ together with the carbon atoms to which they are attached may form a 5-membered or larger hydrocarbon ring;
epoxides of the general formula

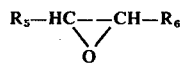

in which $R_5$ is hydrogen, alkyl, aryl or alkylaryl, $R_6$ is hydrogen, alkyl, chloroalkyl (chloromethyl), bromoalkyl (bromomethyl), iodoalkyl (iodomethyl), aryl and arylalkyl, halophenols of the formula

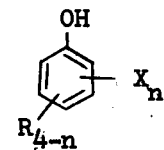

in which X denotes chlorine, bromine or iodine, R denotes alkyl, aryl or a condensed aromatic group and $n = 1$ to 4;
c. aluminium trialkyls, e.g. $Al(CH_3)_3$, $Al(C_2H_5)_3$ or $Al(iso-C_4H_9)_3$; aluminium alkoxyalkyls, e.g. $Al(C_2H_5)_2$ $(OC_2H_5)$, aluminium trihalides, e.g. $AlCl_3$ or $AlBr_3$.

The etherates of the various aluminium compounds may also be used.

Suitable alkyl groups are in particular those which contain 1 to 6 carbon atoms; aryl groups are preferably those with 6–10 carbon atoms (such as phenyl, tolyl, naphthyl); alkylaryl groups are preferably combinations of the aforesaid alkyl and aryl groups.

As general rule, the tungsten compound is used in amounts of 0.05 to 10 mmol, preferably 0.1–2 mmol per 100 g of monomer. The catalyst preferably contains 1 to 6 mol and preferably 1 to 3 mol of compound (b) and 0.5 to 30 mol, preferably 0.8–20 mol of aluminium compound (c) per mol of tungsten in the tungsten compound.

Suitable solvents for the process are aliphatic hydrocarbons, e.g. pentane, hexane, isooctane or methylene chloride; cycloaliphatic hydrocarbons such as cyclopentane or cyclohexane; and aromatic compounds such as benzene, toluene or chlorobenzene; 5–50 percent solutions of cyclooctadiene-(1,5) in the above mentioned solvents are suitable. Concentrations of 10 to 30 percent are preferred.

The process is generally carried out by adding the catalyst components successively to a solution of cyclooctadiene in a suitable solvent at $-60°$ to $+60°C$, preferably $-20°$ to $+LC$, where upon polymerisation proceeds. It is not necessary to preform the catalyst. Polymerisation is preferably carried out with exclusion of air and moisture, e.g. under an inert gas atmosphere (nitrogen, argon). The sequence in which the catalyst components are added is not critical but the sequence a), b), c) is preferred. The usual activators such as $BF_3$ or its etherates or iodine or ether may be added. Particular modifications of the process will be indicated below.

In a continuous polymerisation it is advantageous to prereact the tungsten salt (tungsten hexachloride) with catalyst constituent (b) (the halogenated alcohol or halogenated phenol) in a small amount of the solvent used in the polymerisation, to form a concentrated "tungsten solution." This "tungsten solution" and subsequently or simultaneously the aluminium compound (c) are then continuously fed into a stream of monomer solution. Polymerisation starts as soon as the organo aluminium compound is added.

The polymerisation temperature is $-60°$ to $60°C$ and is preferably $-20°$ to $30°C$; the polymerisation time is usually 1 to 5 hours. Conversions of cyclooctadiene-(1,5) to polyoctadienamer of 60 to 90 percent or more are obtained in this way.

When the required degree of conversion has been achieved, polymerisation can be stopped, e.g. by the addition of alcohols, carboxylic acids and/or amines. The stabilisers and anti-ageing additives commonly used for rubbers may be added in quantities of 0.2 to 3 percent, e.g. phenyl-$\beta$-naphthylamine, 2,6-di-tert.-butyl-4-methylphenol or 2,2'-dihydroxy-3,3'-di-tert.-butyl-5,5'-dimethyl-diphenylmethane.

The polymer can be isolated by precipitation with an alcohol, e.g. methanol, ethanol or isopropanol. On a technical scale, it is preferred to recover the polymer by introducing its solution into hot water. Unreacted monomer and an azeotropic mixture of solvent and water then distil off. The polymer is obtained as a crumbly suspension in water. It is separated from the water and dried in a drying chamber, on a band drier, or in a drying screw extruder.

The polymers obtained according to the invention are rubber-like products in which the trans-double bond content may vary between 20 and 85 percent. They can be cross-linked with the usual vulcanisation systems and processed in rubber processing machines.

In all Examples dry apparatus and solutions are employed. The reactions are carried out under an inert gas atmosphere, for example nitrogen.

EXAMPLE 1

200 ml of toluene and 30 ml of cyclooctadiene-(1,5) are introduced into a three-necked glass flask equipped with stirrer and internal thermometer. 1 ml of a 0.05 molar solution of the reaction product of $WCl_6$ and 2-chloroethanol (molar ratio 1 : 2) is then added and the reaction mixture is activated with 1 mmol of $AlBr_3$ (concentrated solution in chlorobenzene). Polymerisation starts at once. The temperature is kept at 20°C by external cooling. 79.2% conversion is obtained after 10 minutes. Polymerisation is then terminated by the addition of 3 ml of a 10% solution of tri-n-butylamine in toluene and the polymer is precipitated with a litre of ethanol after the addition of 0.3 g of 2,2'-dihydroxy-3,3'-di-tert.-butyl-5,5'-dimethyl-diphenylmethane. The polymer is dried to constant weight at 50°C under vacuum.

Double bond content 99.2 percent of the theory (determined by titration with ICl).

cis-Double bond content: 81.8 percent (IR spectroscopy). Quantity of 1,2-polybutadiene units present: 0% [$\eta$] 25°C, toluene: 3.4.

EXAMPLE 2

The same procedure as in Example 1 was employed but 20 mg of butene-(1) were added to the monomer mixture and polymerisation was carried out for 30 minutes at 20°C.

cis-Double bond content: 80.4%; no 1,2-units; [$\eta$] 25°C, toluene: 1.6.

EXAMPLE 3

The same procedure as in Example 2 was employed but using 150 ml of methylene chloride as solvent. The yield was 42.8 percent after 10 minutes at 20°C. cis-Double bond content: 77.7%: no 1,2-units; [$\eta$] 25°C, toluene: 1.3.

EXAMPLE 4

The procedure was the same as in Example 2 but 1 mmol of diphenylether was added before $AlBr_3$.

Yield: 34% cis-Double bond content: 81.4%. No 1,2-units. [$\eta$] 25°C, toluene: 1.5.

EXAMPLE 5

Employing the procedure described in Example 1, a mixture of 80 ml of toluene and 20 ml of COD was introduced into the reaction vessel and 0.2 mmol of a reaction product of $WCl_6$ with 2-chloroethanol (molar ratio 1 : 1.8) and 0.6 mmol of $(C_2H_5)_2AlCl$ were added at −15°C. Polymerisation was carried out for 4 hours at −15°C and the product was worked up as described in Example 1.

Yield: 72.7%. cis-Double bond content: 57.3%. 0.2% of 1,2-units. [$\eta$] 25°C, toluene: 0.8.

EXAMPLE 6

The procedure described in Example 5 was employed but 0.1 mmol of $I_2$ and 0.3 mmol of $(C_2H_5)_2AlCl$ were added to the reaction mixture after the tungsten compound and polymerisation was carried out for 3 hours at −15°C.

Yield: 77%. cis-Double bond content: 73.6%. 0.4% of 1,2-units. [$\eta$] 25°C, toluene: 0.7.

Example 7

The procedure described in Example 5 was employed but 0.1 mmol of $I_2$ and 0.6 mmol of $(C_2H_5)AlCl_2$ were added to the reaction mixture after the tungsten compound and polymerisation was carried out for 3 hours at ±0°C.

Yield: 73.3%. cis-Double bond content: 63.3% No 1,2-units. [$\eta$] 25°C, toluene: 1.6.

EXAMPLE 8

The same procedure as in Example 5 was employed but 0.2 mmol of $I_2$ and 0.2 mmol of $(C_2H_5)_3Al_2Cl_3$ were added after the tungsten compound and polymerisation was carried out for one hour at ±0°C Yield: 81.8%. trans-Double bond content: 70.7%. No 1,2-units [$\eta$] 25°C, toluene: 1.0.

Example 9

Example 8 was repeated but the solvent used was cyclohexane and polymerisation was carried out for 2 hours at 0°C.

Yield: 84.2% trans-Double bond content: 82.8%. No 1,2-units [$\eta$] 25°C, toluene: 1.38.

EXAMPLE 10

The procedure was the same as employed in Example 5 but 200 ppm (based on cyclooctadiene) of butene-(1) were added to the monomer. The catalyst consisted of 0.1 mmol of $WCl_6$, 0.2 mmol of $ClCH_2—CH_2OH$ and 0.4 mmol of $(C_2H_5)_3Al_2Cl_3$. Polymerisation was carried out for 30 minutes at 20°C.

Yield: 83 %. trans-Double bond content 79%. No 1,2-units. [$\eta$] 25°C, toluene: 2.0.

EXAMPLE 11

Example 10 was repeated but using $(C_2H_5)_3Al_2Cl_3$ mixed with diphenylether in proportions of 1 : 2. Polymerisation was carried out for 2 hours at 20°C.

Yield: 92%. trans-Double bond content 78%. No 1,2-units [$\eta$] 25°C, toluene: 2.2.

We claim:

1. A process for producing polyoctadienamers having 20 to 85 percent of the double bonds in the transconfiguration which comprises polymerizing cyclooctadiene-(1,5) in the presence of a catalyst comprising:
a. a tungsten salt;
b. at least one member selected from the group consisting of
  i. a halo alcohol of the formula

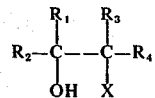

wherein
X is chlorine, bromine or iodine;
$R_1$ and $R_2$, when taken separately, are the same or different and are each selected from the group consisting of hydrogen, alkyl having 1 to 6 carbon atoms, aryl having 6 to 10 carbon atoms and alkaryl having 1 to 6 carbon atoms in the alkyl moiety and 6 to 10 carbon atoms in the aryl moiety;
$R_3$ and $R_4$ may be the same or different and are each selected from the group consisting of chlorine, bromine, iodine, hydrogen, alkyl having 1 to 6 carbon atoms, aryl having 6 to 10 carbon atoms and alkaryl having 1 to 6 carbon atoms in the alkyl moiety and having 6 to 10 carbon atoms in the aryl moiety, and $R_1$ and $R_2$, when taken together with the carbon atoms to which they are attached, form a hydrocarbon ring containing at least 5 carbon atoms;
ii. an epoxide of the formula

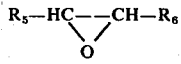

wherein
$R_5$ is hydrogen, alkyl having 1 to 6 carbon atoms, aryl having 6 to 10 carbon atoms or alkaryl having 1 to 6 carbon atoms in the alkyl moiety and having 6 to 10 carbon atoms in the aryl moiety; and
$R_6$ is hydrogen, alkyl, chloroaklyl, bromoalkyl or iodoalkyl, each having 1 to 6 carbon atoms in the alkyl moiety, aryl having 6 to 10 carbon atoms or aralkyl having 6 to 10 carbon atoms in the aryl moiety and having 1 to 6 carbon atoms in the alkyl moiety; and
iii. a halo phenol of the formula

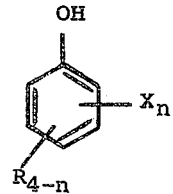

wherein X is aforesaid, R is alkyl having 1 to 6 carbon atoms, aryl having 6 to 10 carbon atoms or a condensed aromatic group, and $n$ is an integer of from 1 to 4;
c. an aluminum organic compound, an aluminum halide or a mixture thereof,
said catalyst containing 0.05 to 10 mmol of tungsten per 100 gm of cyclooctadiene-(1,5), 1 to 6 mols of (b) per mol of tungsten and 0.05 to 30 mol of (c) per mol of tungsten.

2. The process of claim 1 wherein said cyclooctadiene-(1,5) is polymerized in an inert organic solvent.

3. The process of claim 1 wherein (a) is $WCl_6$, $WCl_5$, $WBr_5$ or $WOCl_4$.

4. The process of claim 1 wherein (b) is 2-chloroethanol.

5. The process of claim 1 wherein (c) is aluminum trialkyl, aluminum alkoxyalkyl or aluminum trihalide.

* * * * *